United States Patent
Balaz

(10) Patent No.: US 11,641,158 B2
(45) Date of Patent: May 2, 2023

(54) CLOSED LOOP COMMUTATION CONTROL FOR A SWITCHING POWER CONVERTER

(71) Applicant: TEXAS INSTRUMENTS INCORPORATED, Dallas, TX (US)

(72) Inventor: Pavol Balaz, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/193,724

(22) Filed: Mar. 5, 2021

(65) Prior Publication Data
US 2021/0281167 A1 Sep. 9, 2021

Related U.S. Application Data

(60) Provisional application No. 62/985,722, filed on Mar. 5, 2020.

(51) Int. Cl.
*H02M 1/08* (2006.01)
*H02M 1/44* (2007.01)

(52) U.S. Cl.
CPC ............... *H02M 1/44* (2013.01); *H02M 1/08* (2013.01)

(58) Field of Classification Search
CPC ............................................... H02M 1/08–096
See application file for complete search history.

(56) References Cited

U.S. PATENT DOCUMENTS 5,589,784 A * 12/1996 Phillips ................. H03K 5/153
327/131
2011/0148376 A1* 6/2011 Xu ....................... H03K 17/165
327/434

* cited by examiner

*Primary Examiner* — Peter M Novak
(74) *Attorney, Agent, or Firm* — Ray A. King; Frank D. Cimino

(57) ABSTRACT

A system includes a switching power converter, including a first transistor having a first gate, a first drain, and a first source, the first drain adapted to be coupled to a power supply. The switching power converter also includes a second transistor having a second gate, a second drain, and a second source, the second gate coupled to a second gate driver, the second source adapted to be coupled to ground, and the second drain coupled to the first source. The switching power converter also includes a third transistor having a third gate, a third drain, and a third source, the third gate adapted to be coupled to a current source, the third source coupled to a resistor, and the third drain coupled to the first gate. The switching power converter includes a capacitor coupled to the first drain and adapted to be coupled to the current source.

10 Claims, 5 Drawing Sheets

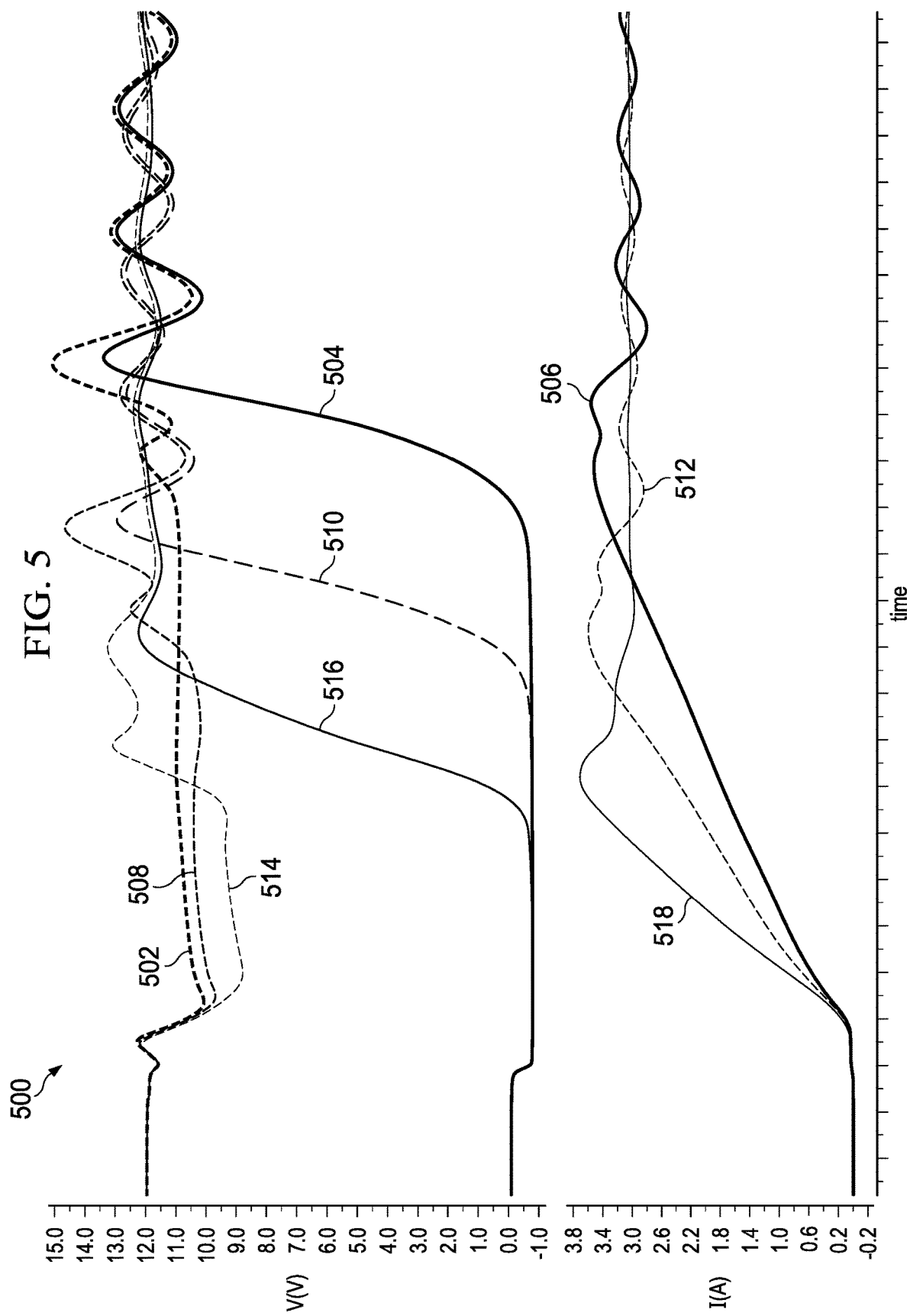

CLOSED LOOP COMMUTATION CONTROL FOR A SWITCHING POWER CONVERTER

CROSS-REFERENCE TO RELATED APPLICATION

This application claims priority to U.S. Provisional Patent Application No. 62/985,722, filed Mar. 5, 2020, which is hereby incorporated herein by reference in its entirety.

BACKGROUND

Responsive to a switched mode power supply (e.g., a power converter) changing phase (such as turning off one power switch and turning on another), current commutates from the turned-off switch into the newly turned-on switch. Accordingly, current stops flowing through the turned-off switch and begins flowing through the newly turned-on switch. This current commutation causes ringing due to inductor (L) and capacitor (C) oscillations formed by parasitic inductances in the current paths and the capacitances of circuit devices. These LC oscillations cause noise and electromagnetic interference (EMI). Rapid changes in current cause magnetic fields to change, which radiates EMI. Rapid changes in voltage cause electric fields to change, which also radiates EMI.

SUMMARY

In accordance with at least one example of the description, a system includes a switching power converter, including a first transistor having a first gate, a first drain, and a first source, the first drain adapted to be coupled to a power supply. The switching power converter also includes a second transistor having a second gate, a second drain, and a second source, the second gate coupled to a second gate driver, the second source adapted to be coupled to ground, and the second drain coupled to the first source. The switching power converter also includes a third transistor having a third gate, a third drain, and a third source, the third gate adapted to be coupled to a current source, the third source coupled to a resistor, and the third drain coupled to the first gate. The switching power converter includes a capacitor coupled to the first drain and adapted to be coupled to the current source.

In accordance with at least one example of the description, a system includes a gate driver configured to provide a first current to a first gate of a first transistor, the first transistor having a first source and a first drain. The gate driver includes a second transistor having a second gate, a second source, and a second drain, the second gate coupled to a first terminal of a resistor, the second source coupled to a second terminal of the resistor, and the second drain coupled to the first gate. The gate driver includes a third transistor having a third gate, a third source, and a third drain, the third gate coupled to a first terminal of a capacitor, the third source adapted to be coupled to ground, and the third drain coupled to the second gate, the third transistor configured to provide a second current through the resistor. The capacitor has a second terminal coupled to the first drain, and the capacitor is configured to provide a voltage to the third gate, the voltage modulates the second current provided by the third transistor.

In accordance with at least on example of the description, a switching power converter, includes a first transistor having a first gate, a first drain, and a first source, the first drain adapted to be coupled to a power supply, and the first source adapted to be coupled to an output inductor. The switching power converter includes a second transistor having a second gate, a second drain, and a second source, the second gate adapted to be coupled to a current source, the second source coupled to a resistor, and the second drain coupled to the first gate, the second transistor configured to provide a current to the first gate. The switching power converter includes a capacitor coupled to the first drain and adapted to be coupled to the current source, the capacitor configured to modulate a current provided by the current source.

BRIEF DESCRIPTION OF THE DRAWINGS

FIG. 5 is a collection of waveforms of voltages and currents in a buck converter for various values of a coupling capacitor in various examples.

DETAILED DESCRIPTION

In a switched mode power supply (e.g., a switching converter), current commutation causes ringing due to LC oscillations, which, in turn, causes noise and EMI. In noise and EMI-sensitive applications, controlling the commutation process can reduce ringing. One way to control the commutation process and reduce ringing is to provide smoother and/or more constant changes in voltages and currents in the switching converter. In examples herein, an alternating current (AC) loop is useful for controlling the turn-on and turn-off process of gate driver transistors that cause current commutation in the current path of a switching converter. Responsive to a high-side power transistor in the switching converter turning on, the AC loop controls the transistor that charges the gate of the high-side power transistor. Responsive to the high-side power transistor turning off, the AC loop controls the transistor that discharges the gate of the high-side power transistor. Examples herein provide systems and methods to control the change in the current (dI/dt) of the high-side power transistor during the turn-on process. Setting dI/dt to a small value reduces ringing and EMI.

Figure 1:
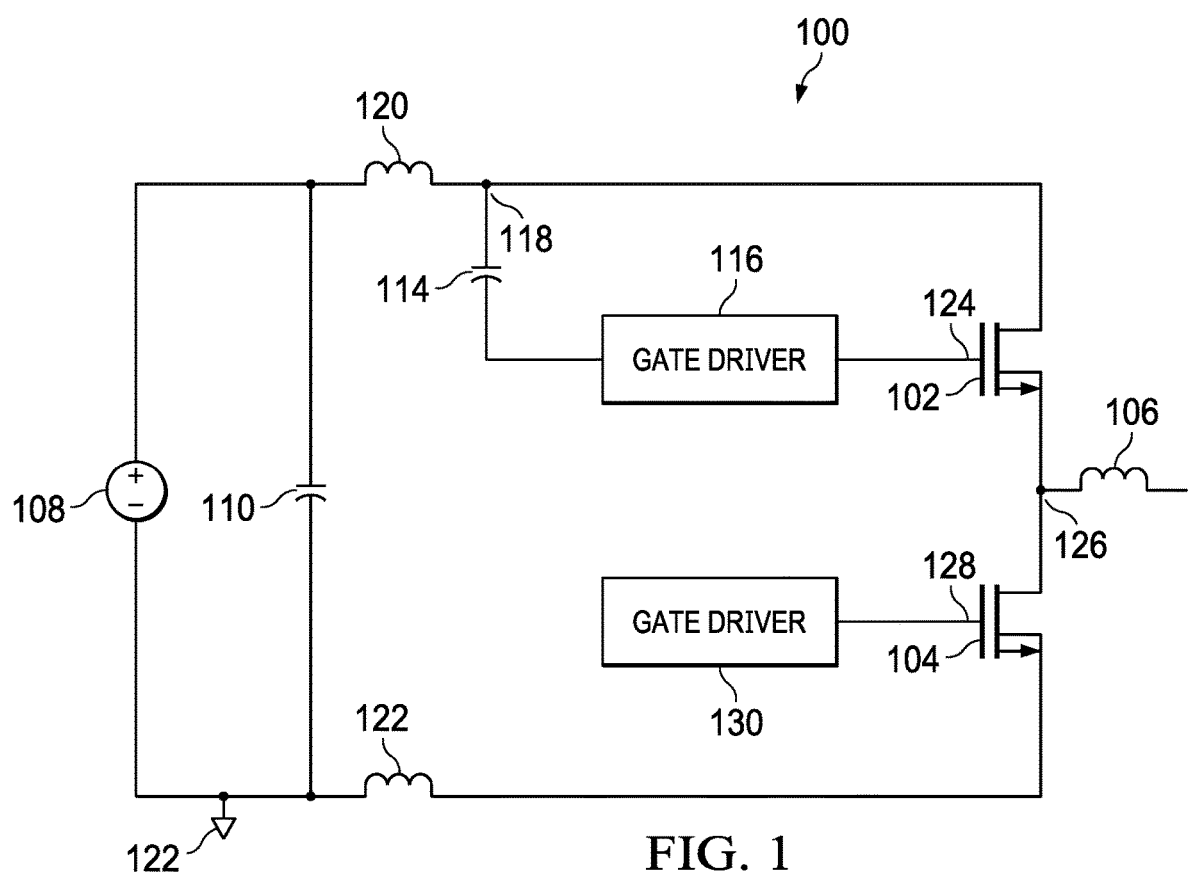
FIG. 1 is a circuit schematic of a buck converter with closed loop commutation control in various examples.

FIG. 1 is a buck converter 100 in various examples. The scope of this description is not limited to buck converters, and other types of converters, such as boost converters and buck-boost converters may be controlled by the gate drivers described herein. In some examples, the buck converter 100 includes a high-side power transistor 102 (e.g., a field effect transistor (FET), such as a metal oxide semiconductor FET (MOSFET)) and a low-side power transistor 104 (e.g., a FET, such as a MOSFET). A source terminal of the high-side power transistor 102 is coupled to a drain terminal of the low-side power transistor 104, and both of these source and drain terminals are coupled to an output inductor 106.

In some examples, the buck converter 100 includes a voltage source 108 and an input capacitor 110 coupled in parallel with the voltage source 108. The voltage source 108, the input capacitor 110, and a source terminal of the low-side power transistor 104 are coupled to ground 112 via $L_{PAR}$ 122. A coupling capacitor 114 ($C_{COUP}$) is coupled to a gate driver 116 and to a node 118. The node 118 is coupled to the voltage source 108, the input capacitor 110, and the drain terminal of the high-side power transistor 102.

The buck converter 100 includes parasitic inductances $L_{PAR}$ 120 and $L_{PAR}$ 122. The parasitic inductance $L_{PAR}$ 120 is shown at node 118, between the voltage source 108 and the drain terminal of the high-side power transistor 102. The parasitic inductance $L_{PAR}$ 122 is shown at ground 112, between the voltage source 108 and the source terminal of the low-side power transistor 104. Parasitic inductances $L_{PAR}$ 120 and 122 represent inductances of printed circuit board traces in some examples.

The high-side power transistor 102 includes a gate 124, which is coupled to the gate driver 116. The high-side power transistor 102 is coupled, through a switch node 126, to the low-side power transistor 104, and the low-side power transistor 104 includes a gate 128 that is coupled to a gate driver 130. Examples herein describe systems and methods for controlling the change in current (dI/dt) of the high-side power transistor during the turn-on process.

In operation, each time high-side power transistor 102 is turned on or off, current is commutated into or out of parasitic inductance $L_{PAR}$ 120 and $L_{PAR}$ 122. For example, gate driver 116 begins charging the gate-to-source voltage ($V_{GS}$) of high-side power transistor 102 as low-side power transistor turns off, as described with respect to FIG. 2 below. The $V_{GS}$ of high-side power transistor 102 reaches its threshold voltage $V_{TH}$, which turns on high-side power transistor 102 and causes a voltage $PV_{IN}$ at node 118 to drop. The voltage $PV_{IN}$ at node 118 drops because $L_{PAR}$ 120 conducts no current at this time. The voltage drop at node 118 creates a voltage differential across parasitic inductance $L_{PAR}$ 120. The voltage differential across parasitic inductance $L_{PAR}$ 120 creates a change in current dI/dt through parasitic inductance $L_{PAR}$ 120. The magnitude of the voltage differential across parasitic inductance $L_{PAR}$ 120 defines the change in current dI/dt through parasitic inductance $L_{PAR}$ 120. The drop in voltage $PV_{IN}$ at node 118 is useful as an input to gate driver 116, as described below with respect to FIG. 2. Gate driver 116 controls the current that is provided to the gate 124 of high-side power transistor 102, using the drop in voltage $PV_{IN}$ at node 118, to control the dI/dt of the drain current of high-side power transistor 102. A relatively low and constant dI/dt of the drain current of high-side power transistor 102 reduces ringing and EMI responsive to high-side power transistor 102 turning on.

Figure 2:
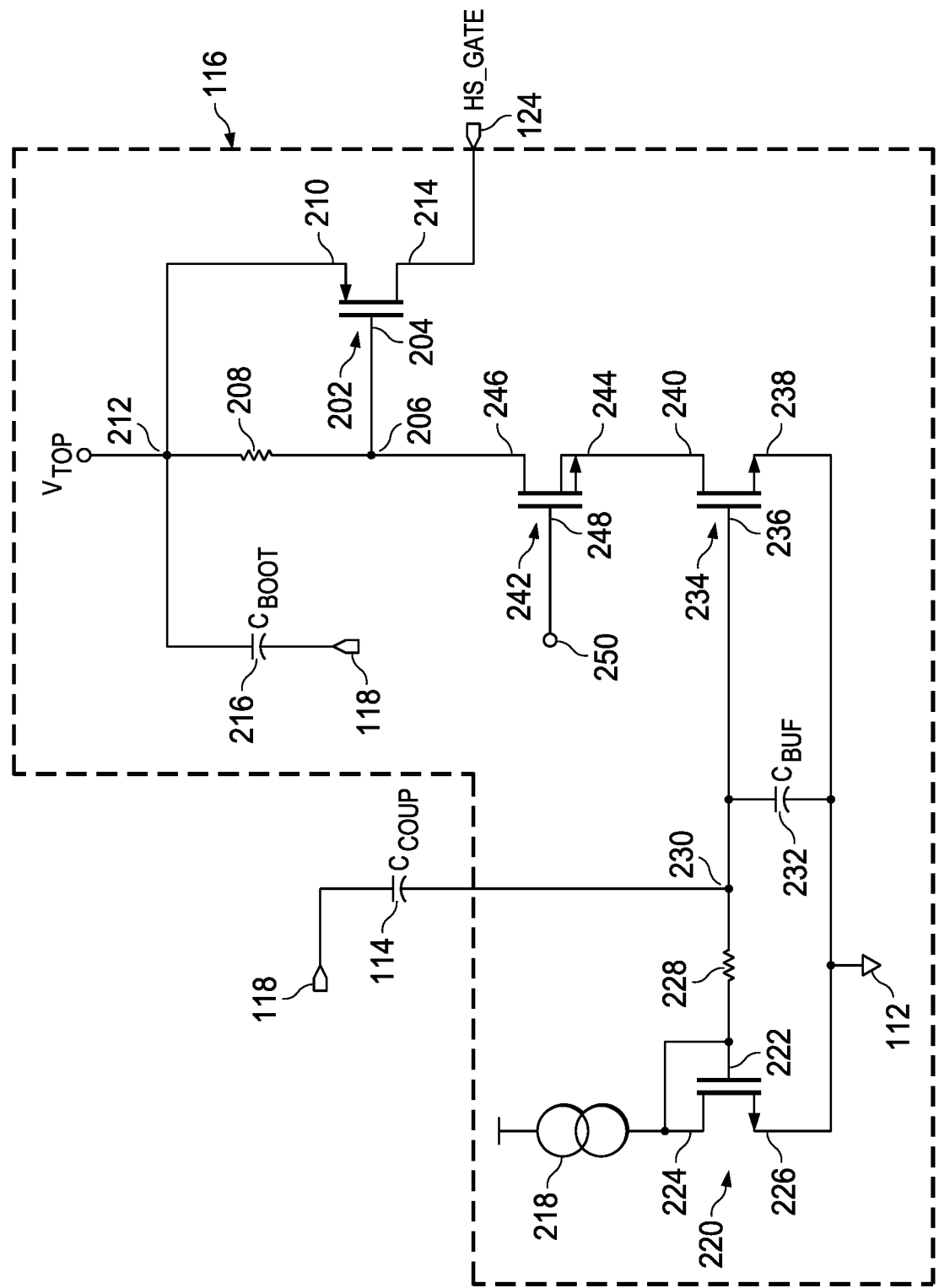
FIG. 2 is a circuit schematic of a gate driver for closed loop commutation control in various examples.

FIG. 2 is a gate driver for closed loop commutation control in accordance with various examples herein. A dashed line in FIG. 2 shows the components in gate driver 116. Gate driver 116 has a high-side transistor 202 that provides current to gate 124 of high-side power transistor 102. High-side transistor 202 is also referred to as a gate-driver transistor. High-side transistor 202 is a p-channel FET (e.g., p-channel MOSFET) ("PFET") in one example. High-side transistor 202 has a gate 204 coupled to node 206 and a first terminal of resistor 208. High-side transistor 202 has a source terminal 210 coupled to a second terminal of resistor 208 and node 212. A supply voltage $V_{TOP}$ is provided at node 212 during operation. High-side transistor 202 has a drain terminal 214 coupled to gate 124 of high-side power transistor 102. The source terminal 210 is also coupled to a first terminal of a bootstrap capacitor $C_{BOOT}$ 216. The second terminal of $C_{BOOT}$ 216 is coupled to node 118 in one example. In another example, the second terminal of $C_{BOOT}$ 216 is coupled to switch node 126 shown in FIG. 1. High-side transistor 202 may be referred to as a third transistor having a third gate 204, a third drain terminal 214, and a third source terminal 210.

Gate driver 116 operates to control the current that high-side transistor 202 provides to gate 124 of high-side power transistor 102, using the AC signal at node 118. Gate driver 116 includes a current source 218 coupled to transistor 220. Transistor 220 is an n-channel FET (e.g., n-channel MOSFET) ("NFET") in one example. Transistor 220 has a gate 222 coupled to its drain terminal 224. Drain terminal 224 is coupled to current source 218. Source terminal 226 of transistor 220 is coupled to ground 112. Gate 222 of transistor 220 is also coupled to a first terminal of resistor 228. In an example, transistor 220 is a fifth transistor having a fifth gate 222, a fifth drain terminal 224, and a fifth source terminal 226. A second terminal of resistor 228 is coupled to node 230. Node 230 is coupled to the second terminal of coupling capacitor 114. The first terminal of coupling capacitor 114 is coupled to node 118. A voltage $PV_{IN}$ at node 118 provides the input to gate driver 116 in an example.

Gate driver 116 also includes a buffer capacitor ($C_{BUF}$) 232 with a first terminal coupled to node 230 and a second terminal coupled to ground 112. Transistor 234 includes a gate 236 coupled to the first terminal of buffer capacitor 232. A source terminal 238 of transistor 234 is coupled to ground 112, and a drain terminal 240 of transistor 234 is coupled to transistor 242. In an example, transistors 234 and 220 are n-channel FETS (e.g., n-channel MOSFETS) and have similar device properties. In an example, transistor 234 is a fourth transistor having a fourth gate 236, a fourth source terminal 238, and a fourth drain terminal 240.

Transistor 242 has a source terminal 244 coupled to drain terminal 240 of transistor 234. Transistor 242 has a drain terminal 246 coupled to node 206. Transistor 242 has a gate 248 coupled to a control node 250. Control node 250 receives a signal from a controller (not shown in FIG. 2) that provides a voltage at the gate 248 of transistor 242 to turn on transistor 242 during operation of gate driver 116.

Referring to FIGS. 1 and 2, as described above, as high-side power transistor 102 reaches its $V_{TH}$, a voltage $PV_{IN}$ at node 118 drops to commutate the load current from low-side power transistor 104 into highs-side transistor 102. This voltage differential is used as an input for gate driver 116 to control the current provided by high-side transistor 202 to gate 124 of high-side power transistor 102. Controlling this current allows dI/dt of high-side power transistor 102 to be controlled as well, which allows for a small dI/dt to reduce ringing and EMI. In an example operation, low-side power transistor 104 is on and high-side power transistor 102 is off. To continue operation of buck converter 100, low-side power transistor 104 is turned off and high-side power transistor 102 is turned on. Then, current has to commutate from low-side power transistor 104 into high-side power transistor 102.

In an example operation, transistor 220 is connected to current source 218 in a diode configuration. Transistors 220 and 234 act as current mirrors. In the current mirror configuration, current from current source 218 flows through transistor 220 from current source 218. Transistor 234 mirrors the current that flows through transistor 220, and therefore acts as a current source. Also, resistor 228 operates to decouple node 230 from transistor 220, to prevent transistor 220 from corrupting the voltage coupled from node 118 to node 230 by coupling capacitor 114. Transistor 242 acts as a switch, and is controlled by a digital control signal at control node 250 from a controller (not shown). If transistor 234 is on and conducting current, and transistor 242 is on via the digital control signal at control node 250, a voltage drop occurs across resistor 208. With a voltage $V_{TOP}$ applied at node 212, the voltage drop across resistor 208 turns high-side transistor 202 fully on. In this example, fully on means that high-side transistor 202 is at or near a maximum gate-to-source voltage, and the high-side transistor 202 is providing as much or nearly as much current as it is capable of providing to gate 124 of high-side power transistor 102.

As commutation begins in buck converter 100, a voltage $PV_{IN}$ at node 118 begins to drop. Accordingly, the voltage $PV_{IN}$ at node 118 begins to drop as soon as $V_{GS}$ of high-side power transistor 102 surpasses the voltage threshold VIE of high-side power transistor 102. Coupling capacitor 114 couples the voltage drop at node 118 to node 230. As the voltage drops at node 230, the voltage at gate 236 also drops, thereby modulating the current that is sunk by transistor 234. Therefore, transistor 234 acts as a current source that is controlled by the AC signal at node 118. The more that the voltage $PV_{IN}$ at node 118 drops, the more current is sunk by the transistor 234.

A goal of gate driver 116 is that during the turn-on process for high-side power transistor 102, a constant or approximately constant dI/dt through high-side power transistor 102 occurs. A constant or approximately constant dI/dt reduces noise and EMI. Also, a dI/dt with a low magnitude reduces noise and EMI. The magnitude of dI/dt is dependent on the voltage drop across the parasitic inductance $L_{PAR}$ 120. For the dI/dt to be constant or approximately constant, a constant voltage drop across parasitic inductance $L_{PAR}$ 120 is useful. Also, a voltage drop across parasitic inductance $L_{PAR}$ 120 with a low magnitude acts to produce a dI/dt with a low magnitude. For a constant voltage drop across parasitic inductance $L_{PAR}$ 120, a constant change in the gate-to-source voltage ($V_{GS}$) of high-side power transistor 102 is useful. To provide the constant change in $V_{GS}$ ($dV_{GS}/dt$) of high-side power transistor 102, the $V_{GS}$ is charged with a current source, such as by gate driver 116. Gate driver 116 provides a current to result in a nearly constant $dV_{GS}/dt$. Achieving the nearly constant $dV_{GS}/dt$ results in the low and constant dI/dt during commutation.

In operation, as the $V_{GS}$ of high-side power transistor 102 crosses a threshold voltage $V_{TH}$ of the high-side power transistor 102, the high-side power transistor 102 begins to conduct current. Responsive to the current beginning to conduct, the voltage $PV_{IN}$ at node 118 drops because parasitic inductance $L_{PAR}$ 120 has zero current through it at this time. Coupling capacitor 114 couples the voltage drop at node 118 to node 230, which decreases the current through transistor 234. A decrease in the current through transistor 234 reduces the voltage drop across resistor 208, and the current provided by high-side transistor 202 is also decreased.

High-side transistor 202 charges gate 124 and acts like a current source charging a capacitor, which produces a constant dV/dt. Gate driver 116 sets the current through high-side transistor 202, so the $dV_{GS}/dt$ of high-side power transistor 102 matches the dI/dt of the drain current of high-side power transistor 102. Because of this, the drain-to-source voltage $V_{DS}$ of high-side power transistor 102 remains constant. This means that the voltage across parasitic inductance $L_{PAR}$ 120 stays constant, which produces a constant dI/dt in high-side power transistor 102.

As described above, the $dV_{GS}/dt$ set by gate driver 116 determines the dI/dt of high-side power transistor 102 and the $V_{DS}$ of high-side power transistor 102 during commutation. The $dV_{GS}/dt$ is set by the ratio between coupling capacitor 114 and buffer capacitor 232.

After commutation is complete, the switch node 126 between the high-side power transistor 102 and low-side power transistor 104 begins to rise. Other circuitry (not shown in FIG. 1 or 2) senses that rise, and turns off transistor 242 by applying a control signal to control node 250. Turning off transistor 242 stops current flowing through transistor 242 during the high-side phase of buck converter 100. After commutation is complete, gate driver 116 is not useful until a next commutation process, so turning off transistor 242 turns off high-side transistor 202 as well.

Figure 3:
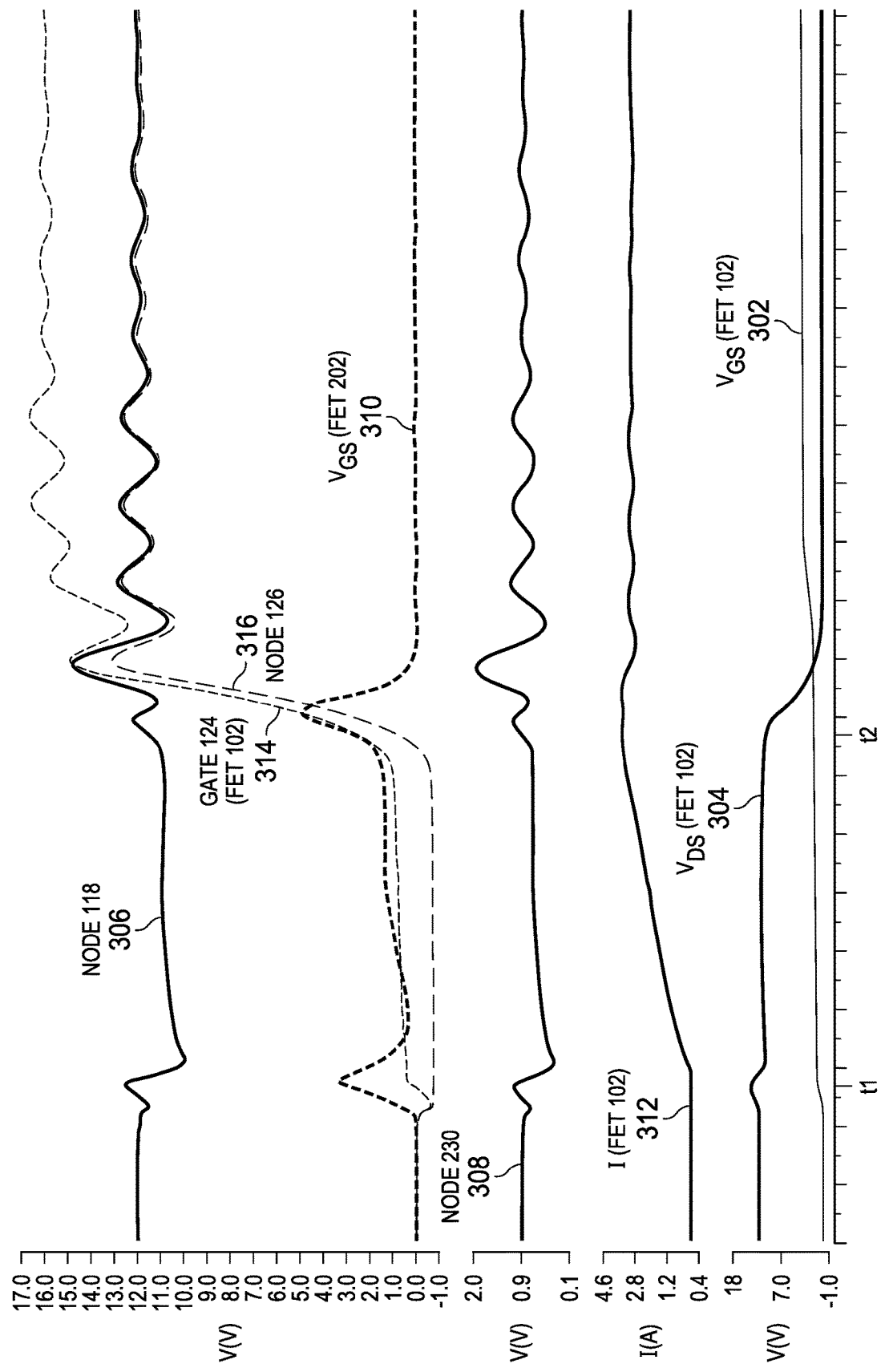
FIG. 3 is collection of waveforms of voltages and currents in a buck converter and gate driver in various examples.

FIG. 3 is a collection of waveforms 300 of voltages and currents in buck converter 100 and gate driver 116. The x-axis is time. The y-axes for waveforms 302, 304, 306, 308, 310, 314, and 316 are voltage values. The y-axis for waveform 312 is current.

The waveforms 300 represent a time period during which high-side power transistor 102 transitions from an off state to an on state. Waveform 302 is the $V_{GS}$ of high-side power transistor 102. At a time $t_1$, waveform 302 has a slight increase in voltage. This increase occurs as the $V_{GS}$ rises from 0 volts to the threshold voltage $V_{TH}$. VGS then rises further through time $t_2$ and beyond as high-side power transistor 102 turns more fully on. Waveform 304 is the $V_{DS}$ of high-side power transistor 102. At the time $t_1$, $V_{DS}$ of high-side power transistor 102 begins to drop because high-side power transistor 102 is now turned on and conducting current. At around time $t_2$, high-side power transistor 102 is fully on and conducting a relatively steady current, so $V_{DS}$ drops. In sum, $V_{GS}$ has risen above the threshold voltage $V_{TH}$, and a $V_{DS}$ exists across high-side power transistor 102.

Waveform 306 represents the voltage at node 118. At time $t_1$, the voltage at node 118 drops, and this change in voltage is provided to gate driver 116, as described above. This voltage drop is coupled to node 230 by coupling capacitor 114 as shown in FIG. 2. Waveform 308 is the voltage at node 230. The AC signal (e.g., the voltage drop) at node 118 at time $t_1$ is also reflected in waveform 308 at time $t_1$. As the voltage on node 118 drops, the voltage at node 230 also drops. The AC signal at node 118 therefore modulates node 230.

Waveform 310 represents the $V_{GS}$ of high-side transistor 202. Because high-side transistor 202 is a p-channel FET in this example, waveform 310 represents the $V_{GS}$ multiplied by −1. High-side transistor 202 is turned on strongly at time $t_1$ (e.g., it has a $V_{GS}$ of almost 4 V), but this $V_{GS}$ begins to drop as the voltage at node 118 drops (waveform 306) after time $t_1$.

Waveform 312 represents the current through high-side power transistor 102. Waveform 312 represents the overall goal of gate driver 116, which is achievement of a nearly constant dI/dt through high-side power transistor 102. Between time $t_1$ and $t_2$, waveform 312 has a nearly constant rise. In this example, a 3 amp load is driven, so 3 amps are sourced from high-side power transistor 102. Due to gate driver 116, a nearly constant dI/dt is provided. Also, gate driver 116 provides a nearly constant $V_{DS}$ of high-side power transistor 102, as shown on waveform 304 between time $t_1$ and $t_2$.

A nearly constant dI/dt through high-side power transistor 102 is useful for reducing EMI because this causes the rise of switch node 126 to be steady with low fluctuation. High-side power transistor 102 is turned on at full saturation with a $V_{DS}$ that does not fluctuate significantly. Also, because high-side power transistor 102 is in saturation and is operating as a current source, high-side power transistor 102 dampens the LC ringing in buck converter 100. The LC ringing causes ringing at switch node 126 and at node 118. The LC ringing is caused by the capacitance at the switch node 126 and parasitic inductance $L_{PAR}$ 120. If high-side power transistor 102 is in saturation, it has a relatively large impedance, which reduces ringing. Therefore, this relatively large impedance at high-side power transistor 102 dampens the LC tank and reduces EMI.

Waveform 314 is the voltage at gate 124 of high-side power transistor 102, while waveform 316 is the voltage at switch node 126. As shown, these waveforms begin to rise toward their final voltages near time $t_2$, as the current through high-side power transistor 102 (waveform 312) reaches its steady state. Waveforms 314 and 316 exhibit a relatively small amount of ringing after rising toward their final voltage values.

Figure 4:
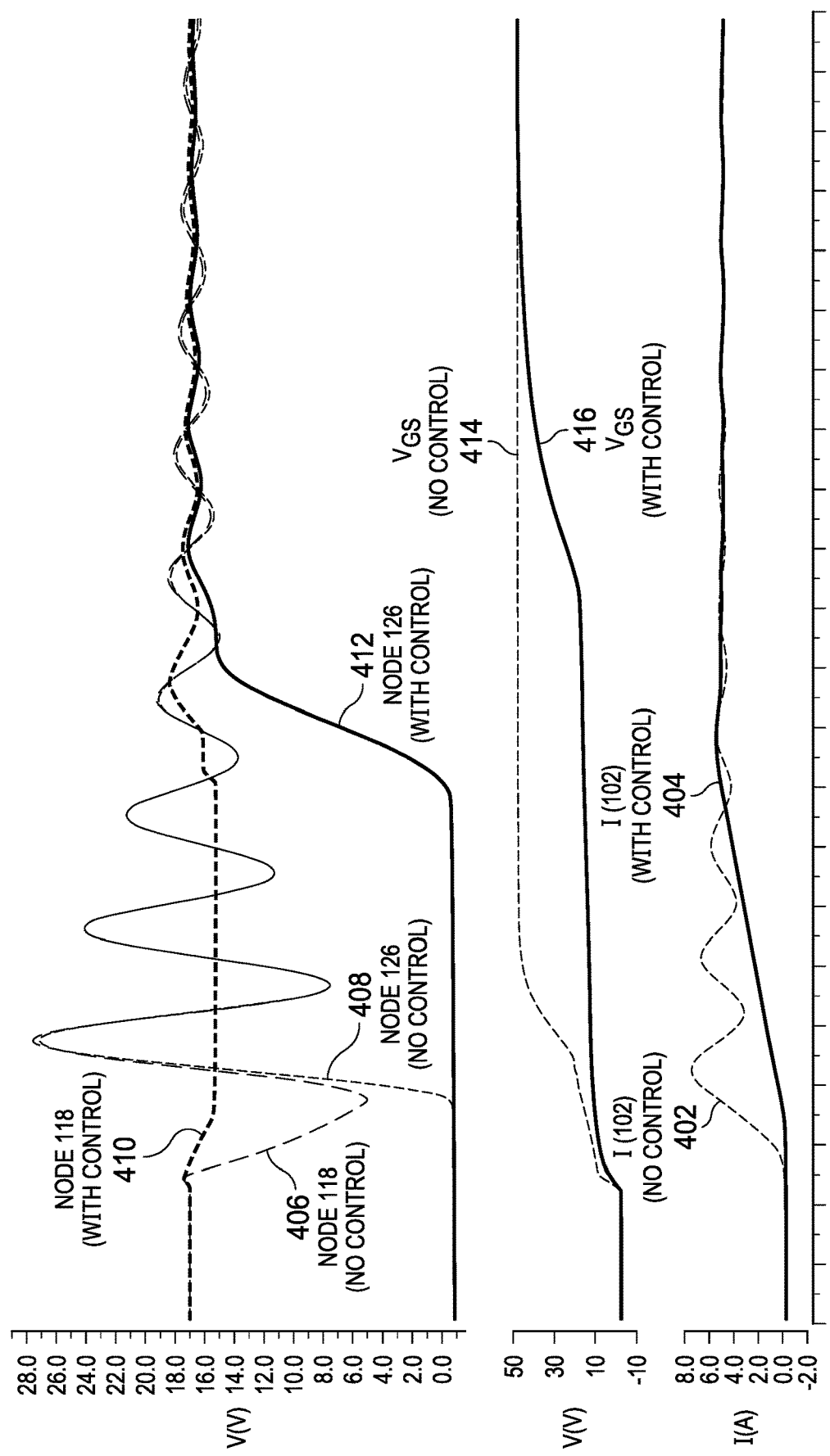
FIG. 4 is a collection of waveforms of voltages and currents in a buck converter with current commutation control and a buck converter without current commutation control in various examples.

FIG. 4 is a collection of graphs 400 of voltages and currents in a buck converter 100 with current commutation control and a buck converter without current commutation control. Waveform 402 shows the current I (102) through high-side power transistor 102 without current commutation control. Relatively large oscillations are shown in waveform 402. In contrast, waveform 404 shows the current I (102) through high-side power transistor 102 with current commutation control as described in FIGS. 1 and 2 above. With current commutation control, a relatively constant rise in current I (102) is shown as waveform 404.

Waveform 406 is the voltage at node 118 without current commutation control. Because waveform 406 is undamped, high-side power transistor 102 operates in linear mode, and therefore it has low impedance. This, in turn, means that the oscillation of the LC tank (the parasitic inductance $L_{PAR}$ 120 and the capacitance at switch node 126) is relatively undamped. Also, the LC tank is strongly excited because a large voltage exists across the parasitic inductance $L_{PAR}$ 120. Therefore, ringing on node 118 is shown in waveform 406 with approximately 20-volt amplitude.

Waveform 408 is the voltage at switch node 126 without current commutation control. Waveform 408 also shows ringing with an amplitude of more than 20 volts and a frequency similar to the frequency of ringing in waveform 406.

Waveform 410 is the voltage at node 118 with current commutation control as described according to an example herein. Waveform 410 shows a relatively stable and flat voltage at node 118 with little ringing, in contrast to the 20 volt amplitude ringing shown in waveform 406. Waveform 412 is the voltage at switch node 126 with current commutation control. Waveform 412 shows a smooth rise from 0 to approximately 17 volts with little ringing, due to the current commutation control according to examples herein. In contrast, waveform 408 shows high ringing at switch node 126 without commutation control, before the waveform reaches a relatively steady state.

Waveform 414 shows the $V_{GS}$ of high-side power transistor 102 with no current commutation control. Waveform 416 shows the $V_{GS}$ of high-side power transistor 102 with current commutation control. Waveform 416 shows a smoother and steadier rise in $V_{GS}$ compared to waveform 414. As described above, in an example herein, gate driver 116 sets the current through high-side power transistor 202, so the $dV_{GS}/dt$ of high-side power transistor 102 matches the dI/dt of the drain current of high-side power transistor 102. The current is also set in a controlled fashion, and this current commutation control reduces ringing and EMI in part by providing a nearly constant $dV_{GS}/dt$, resulting in a controlled (e.g., low ringing) and nearly constant dI/dt with a small magnitude.

FIG. 5 is a collection of graphs 500 of voltages and currents in a buck converter 100 for various values of coupling capacitor 114. The sensitivity of gate driver 116 can be tuned by adjusting the ratio of $C_{COUP}/C_{BUF}$. A greater or lesser reduction in EMI can be obtained by tuning the sensitivity of gate driver 116. In an example, a greater reduction in EMI lowers the commutation speed, while a lesser reduction in EMI raises the commutation speed. A compromise can be made between low EMI and efficiency. The circuit can be tuned to achieve a selected balance between low EMI and efficiency.

Waveform 502 is the voltage at node 118 for a first capacitor ratio $C_{COUP}/C_{BUF}$. Waveform 504 is the voltage at switch node 126 for the first capacitor ratio. Also, waveform 506 is the value of the current of the high-side power transistor 102 for the first capacitor ratio. Waveform 506 has the lowest slope of the current waveforms shown in graphs 500. Waveform 504 shows that this first capacitor ratio takes the longest time for the voltage at switch node 126 to begin rising compared to the other capacitor ratios.

Waveform 508 is the voltage at node 118 for a second capacitor ratio $C_{COUP}/C_{BUF}$. The second capacitor ratio is one-half of the first capacitor ratio. Waveform 510 is the voltage at switch node 126 for the second capacitor ratio. Waveform 512 is the value of the current of the high-side power transistor 102 for the second capacitor ratio. Waveforms 508, 510, and 512 show that for a second capacitor ratio that is half of the first capacitor ratio, the change in current of the high-side power transistor 102 is steeper than the change in current of the first capacitor ratio. Also, the voltage at switch node 126 in waveform 510 rises before the voltage at switch node 126 with the first capacitor ratio begins to rise (as shown in waveform 504). Therefore, the commutation speed is faster with the second capacitor ratio than with the first capacitor ratio.

Waveform 514 is the voltage at node 118 for a third capacitor ratio $C_{COUP}/C_{BUF}$. The third capacitor ratio is one-half of the second capacitor ratio, and one-fourth of the first capacitor ratio. Waveform 516 is the voltage at switch node 126 for the third capacitor ratio. Waveform 518 is the value of the current of the high-side power transistor 102 for the third capacitor ratio. Waveforms 514, 516, and 518 show that the commutation speed is faster with the third capacitor than either the first capacitor ratio or the second capacitor ratio.

As the capacitance of coupling capacitor 114 drops, the gain of gate driver 116 is reduced. Less gain means that a greater drop in the voltage at node 118 is needed to modulate the voltage at node 230. Tuning the capacitor ratio also tunes how much the voltage at node 118 drops, which determines the value of the change in current dI/dt in high-side power transistor 102.

As shown in FIG. 5, the sensitivity of gate driver 116 can be tuned by adjusting the capacitor ratio $C_{COUP}/C_{BUF}$. In an example, customers or users could adjust the capacitor ratio and determine their own tradeoff between reducing EMI and increasing efficiency. For example, if performing a noise-sensitive task, commutation speed could be reduced to reduce noise and EMI. After the noise-sensitive task is complete, the commutation speed could be increased again, which increases efficiency. In an example, a customer or user could adjust the value of coupling capacitor 114 or buffer capacitor 232 by adding or removing capacitors in parallel to either coupling capacitor 114 or buffer capacitor 232 to adjust the capacitor ratio.

Examples herein provide a real-time loop-based analog approach for reducing noise and EMI in a switching power converter. A current source charges a $V_{GS}$ of a high-side power transistor 102. A low and constant value of dI/dt of the high-side power transistor 102 is achieved. The value of dI/dt can be tuned by the ratio of two capacitors, $C_{COUP}/C_{BUF}$. In the examples herein, the circuit can quickly react to changes in input voltage or load. The examples herein can cover a wide range of parasitic inductances, input voltage, and load. The sensitivity of the circuit can also be adjusted as described above.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

In this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," "nearly," or "substantially" preceding a value means +/−10 percent of the stated value. Modifications are possible in the described examples, and other examples are possible within the scope of the claims.

What is claimed is:

1. A system, comprising:
    a first transistor coupled between a power supply terminal and a switching terminal and having a first gate, wherein the first gate is coupled to a first gate driver;
    a second transistor coupled between a ground terminal and the switching terminal and having a second gate, wherein the second gate is coupled to a second gate driver;
    a third transistor coupled between a current source and the ground terminal and having a third gate, wherein the third gate is coupled to the current source and to a resistor; and
    a capacitor coupled between the power supply terminal and the resistor; and
    a fourth transistor having a current terminal and a fourth gate, wherein the current terminal is coupled to ground, and the fourth gate is coupled to the capacitor.

2. The system of claim 1, wherein the third transistor and the fourth transistor form a current mirror.

3. The system of claim 2, wherein the current mirror includes a fifth transistor coupled between the power supply terminal and the first gate and having a fifth gate.

4. The system of claim 3, wherein the resistor is a first resistor, and the system includes a second resistor coupled between the fifth gate and the power supply terminal.

5. The system of claim 1, wherein the capacitor is a first capacitor, and the system includes a second capacitor coupled between the fourth gate and the ground terminal.

6. The system of claim 5, wherein a commutation speed of a current through the first transistor is proportional to a ratio of a capacitance of the first capacitor to a capacitance of the second capacitor.

7. The system of claim 3, wherein the first transistor and the second transistor are n-channel field effect transistors (NFET), and the fifth transistor is a p-channel field effect transistor (PFET).

8. A power converter, comprising:
    a first transistor having a first gate, a first drain, and a first source, the first drain coupled to a power supply terminal, and the first source coupled to an output terminal;
    a second transistor having a second gate, a second drain, and a second source, the second gate coupled to a current source, the second source coupled to a resistor, and the second drain coupled to the first gate, wherein the second transistor is configured to provide a current to the first gate; and
    a capacitor coupled between the first drain and the current source, the capacitor configured to modulate a current provided by the current source;
    wherein the current source includes a third transistor having a third gate, a third source, and a third drain, the third gate coupled to the capacitor, the third source coupled to a ground terminal, and the third drain coupled to the resistor.

9. The power converter of claim 8, wherein the capacitor is a first capacitor, and the power converter further comprises second capacitor coupled between the third gate and the ground terminal.

10. The power converter of claim 9, wherein a commutation speed of a current through the first transistor is proportional to a ratio of capacitances of the first and second capacitors.

\* \* \* \* \*